United States Patent
Matsuyama et al.

(10) Patent No.: US 10,696,338 B2
(45) Date of Patent: Jun. 30, 2020

(54) WALL SURFACE SUCTION-TYPE TRAVEL DEVICE

(71) Applicant: Panasonic Intellectual Property Management Co., Ltd., Osaka (JP)

(72) Inventors: Yoshinari Matsuyama, Osaka (JP); Tomohiro Sekiguchi, Kanagawa (JP); Masaki Shikanai, Kanagawa (JP); Takeshi Kikuchi, Osaka (JP); Tomomi Nishikata, Ishikawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/514,196

(22) Filed: Jul. 17, 2019

(65) Prior Publication Data

US 2019/0337581 A1    Nov. 7, 2019

Related U.S. Application Data

(63) Continuation of application No. PCT/JP2017/045898, filed on Dec. 21, 2017.

(30) Foreign Application Priority Data

Jan. 18, 2017  (JP) ................................ 2017-006812

(51) Int. Cl.
  *B62D 57/024*  (2006.01)
  *B62D 57/032*  (2006.01)
(52) U.S. Cl.
  CPC .................. *B62D 57/024* (2013.01)
(58) Field of Classification Search
  CPC ................................................. B62D 57/024
  (Continued)

(56) References Cited

U.S. PATENT DOCUMENTS 4,926,957 A * 5/1990 Urakami .............. B62D 57/024
                                                                114/222
6,102,145 A * 8/2000 Fisher ..................... B08B 3/024
                                                                180/164
(Continued)

FOREIGN PATENT DOCUMENTS

| JP | 62-215116 | 9/1987 |
| JP | 5-111882 | 5/1993 |
| JP | 2016-97955 | 5/2016 |

OTHER PUBLICATIONS

International Search Report dated Mar. 6, 2018 in corresponding International Application No. PCT/JP2017/045898 (with English translation).

*Primary Examiner* — Tony H Winner
(74) *Attorney, Agent, or Firm* — Wenderoth, Lind & Ponack, L.L.P.

(57) ABSTRACT

A wall surface suction-type travel device is configured to travel on a wall surface while being suctioned on the wall surface. An intermediate chamber communicates with decompression chambers facing the wall surface. A suction device sucks in air from the intermediate chamber to decompress the intermediate chamber. Principal communicating parts allow the decompression chambers to communicate with the intermediate chamber. Secondary communicating parts allow the respective decompression chambers to communicate with the intermediate chamber. Valves face openings of the respective principal communicating parts. An area of an opening of each of the secondary communicating parts is smaller than an area of the opening of a corresponding one of the principal communicating parts. On condition that pressure in one of decompression chambers gets higher than pressure required for wall surface suction, a consequent difference in pressure between the one of decompression (Continued)

chambers and the intermediate chamber causes a corresponding one of the valves to close the opening.

6 Claims, 11 Drawing Sheets

(58) Field of Classification Search
USPC .......................................................... 180/164
See application file for complete search history.

(56) References Cited

U.S. PATENT DOCUMENTS

| | | | | |
|---|---|---|---|---|
| 6,318,489 | B1* | 11/2001 | McGill | B60V 1/04 |
| | | | | 180/116 |
| 2001/0013434 | A1* | 8/2001 | Hopkins | B62D 57/024 |
| | | | | 180/7.1 |
| 2002/0036108 | A1* | 3/2002 | Jeswine | B62D 49/0621 |
| | | | | 180/164 |
| 2003/0048081 | A1 | 3/2003 | Seemann | |
| 2007/0163827 | A1* | 7/2007 | Imus | B62D 55/265 |
| | | | | 180/164 |
| 2007/0235238 | A1* | 10/2007 | Sadegh | B62D 49/0621 |
| | | | | 180/164 |
| 2013/0024067 | A1* | 1/2013 | Troy | B25J 5/007 |
| | | | | 701/36 |
| 2014/0115860 | A1* | 5/2014 | Sarh | B62D 57/024 |
| | | | | 29/428 |
| 2016/0347383 | A1* | 12/2016 | Li | B25J 15/06 |
| 2018/0148114 | A1* | 5/2018 | Niederberger | B62D 57/024 |
| 2018/0168415 | A1* | 6/2018 | Liu | A47L 11/38 |

\* cited by examiner

WALL SURFACE SUCTION-TYPE TRAVEL DEVICE

TECHNICAL FIELD

The present disclosure relates to a wall surface suction-type travel device capable of traveling on a wall surface while being suctioned on the wall surface.

BACKGROUND ART

It is known that a wall surface suction-type travel device as is described in PTL 1 is, for example, capable of traveling on a wall surface while being suctioned on the wall surface. The wall surface suction-type travel device described in PTL 1 includes nine recessed decompression chambers facing a wall surface and two suction devices to suck in air from the decompression chambers. One of the suction devices sucks in air from the five decompression chambers, whereas the other suction device sucks in air from the remaining four decompression chambers. The wall surface suction-type travel device is thereby suctioned on the wall surface. Even if any one of the decompression chambers arrives over a hollow, a through-hole, or any other depression in the wall surface and the decompression chamber reaches atmospheric pressure by communicating with an outside through the hollow or the depression, the wall surface suction-type travel device continues being suctioned on the wall surface by the remaining decompression chambers.

CITATION LIST

Patent Literature

PTL 1: Unexamined Japanese Patent Publication No. 2016-97955

SUMMARY

Unfortunately, if the decompression chambers communicating with the one suction device and the other suction device respectively have communicated with the outside through hollows, through-holes, or other depressions in the wall surface, the wall surface suction-type travel device described in PTL 1 may be possibly unable to be suctioned on the wall surface.

The present disclosure provides a wall surface suction-type travel device that is able to continue being suctioned on a wall surface even if some of a plurality of decompression chambers have communicated with an outside through hollows, through-holes, or other depressions in the wall surface.

A wall surface suction-type travel device according to an aspect of the present disclosure, accomplished to solve the problem described above, is configured to travel on a wall surface while being suctioned on the wall surface. The wall surface suction-type travel device includes a plurality of recessed decompression chambers facing the wall surface, a shared intermediate chamber, a suction device, a plurality of principal communicating parts, a plurality of secondary communicating parts, and a plurality of valves. The intermediate chamber communicates with each of the plurality of decompression chambers. The suction device sucks in air from the intermediate chamber to decompress the intermediate chamber. The plurality of principal communicating parts allows the respective decompression chambers to communicate with the intermediate chamber. The plurality of secondary communicating parts allows the respective decompression chambers to communicate with the intermediate chamber. The plurality of valves faces openings of the respective principal communicating parts. An area of an opening of each of the plurality of secondary communicating parts is smaller than an area of the opening of a corresponding one of the plurality of principal communicating parts. On condition that pressure in one of the plurality of decompression chambers gets higher than pressure required for wall surface suction, a consequent difference in pressure between the one decompression chamber and the intermediate chamber causes the corresponding valve of the plurality of valves to close the opening of the corresponding principal communicating part of the plurality of principal communicating parts.

A wall surface suction-type travel device according to the present disclosure includes a plurality of recessed decompression chambers facing a wall surface and is able to continue being suctioned on the wall surface even if some of the plurality of decompression chambers have communicated with an outside through hollows, through-holes, or other depressions in the wall surface.

DESCRIPTION OF EMBODIMENTS

A wall surface suction-type travel device according to an aspect of the present disclosure is capable of traveling on a wall surface while being suctioned on the wall surface. The wall surface suction-type travel device includes a plurality of recessed decompression chambers facing the wall surface, a shared intermediate chamber, a suction device, a plurality of principal communicating parts, a plurality of secondary communicating parts, and a plurality of valves. The intermediate chamber communicates with each of the plurality of decompression chambers. The suction device sucks in air from the intermediate chamber to decompress the intermediate chamber. The plurality of principal communicating parts allows the respective decompression chambers to communicate with the intermediate chamber. The plurality of secondary communicating parts allows the respective decompression chambers to communicate with the intermediate chamber. The plurality of valves is disposed so as to face openings of the respective principal communicating parts. An area of an opening of each of the plurality of secondary communicating parts is smaller than an area of the opening of each of the plurality of principal communicating parts. If pressure in one of the plurality of decompression chambers gets higher than pressure required for wall surface suction, a consequent difference in pressure between the one decompression chamber and the intermediate chamber causes the corresponding valve of the plurality of valves to close the opening of the corresponding principal communicating part of the plurality of principal communicating parts.

According to this configuration, the wall surface suction-type travel device including the plurality of recessed decompression chambers facing the wall surface is able to continue being suctioned on the wall surface even if some of the plurality of decompression chambers have communicated with an outside through hollows, through-holes, or other depressions in the wall surface.

The wall surface suction-type travel device, for example, includes a plurality of suction units being movable and having the respective decompression chambers and the respective principal communicating parts. The plurality of principal communicating parts is inserted into the intermediate chamber. The plurality of valves is disposed in the intermediate chamber. If pressure in one of the decompression chambers gets higher than pressure required for wall surface suction, a consequent difference in pressure between the one decompression chamber and the intermediate chamber causes the corresponding suction unit of the plurality of suction units to move toward the corresponding valve and lets the corresponding valve close the opening of the corresponding principal communicating part.

The wall surface suction-type travel device, for example, includes an urging member to urge each of the suction units toward each of the valves. This configuration allows an end face opening of a cylinder of the suction unit to be closed by the valve with increased reliability.

The urging member is, for example, a loop-shaped sealant that is made of an elastic material and that is put into contact with the wall surface.

The wall surface suction-type travel device, for example, includes a valve support having elasticity and supporting each of the valves. If pressure in one of the decompression chambers gets higher than pressure required for wall surface suction, a consequent difference in pressure between the one decompression chamber and the intermediate chamber causes the valve support to be elastically deformed such that the corresponding valve moves toward the corresponding principal communicating part to close the opening of the corresponding principal communicating part.

Each of the valves and each of the respective valve supports are integrated together as one component, for example.

Exemplary embodiments will be described in detail below with reference to the drawings as appropriate. However, detailed description more than necessary may be omitted. For example, detailed description of well-known matters and redundant description of structures that are substantially the same may be omitted. This is to avoid unnecessary redundancy in the following description and to facilitate understanding by those skilled in the art.

Note that the inventors provide the accompanying drawings and the description below to help those skilled in the art to fully understand the present disclosure, and do not intend to use the accompanying drawings or the description below to limit the subject matter described in the claims.

First Exemplary Embodiment

Figure 1:
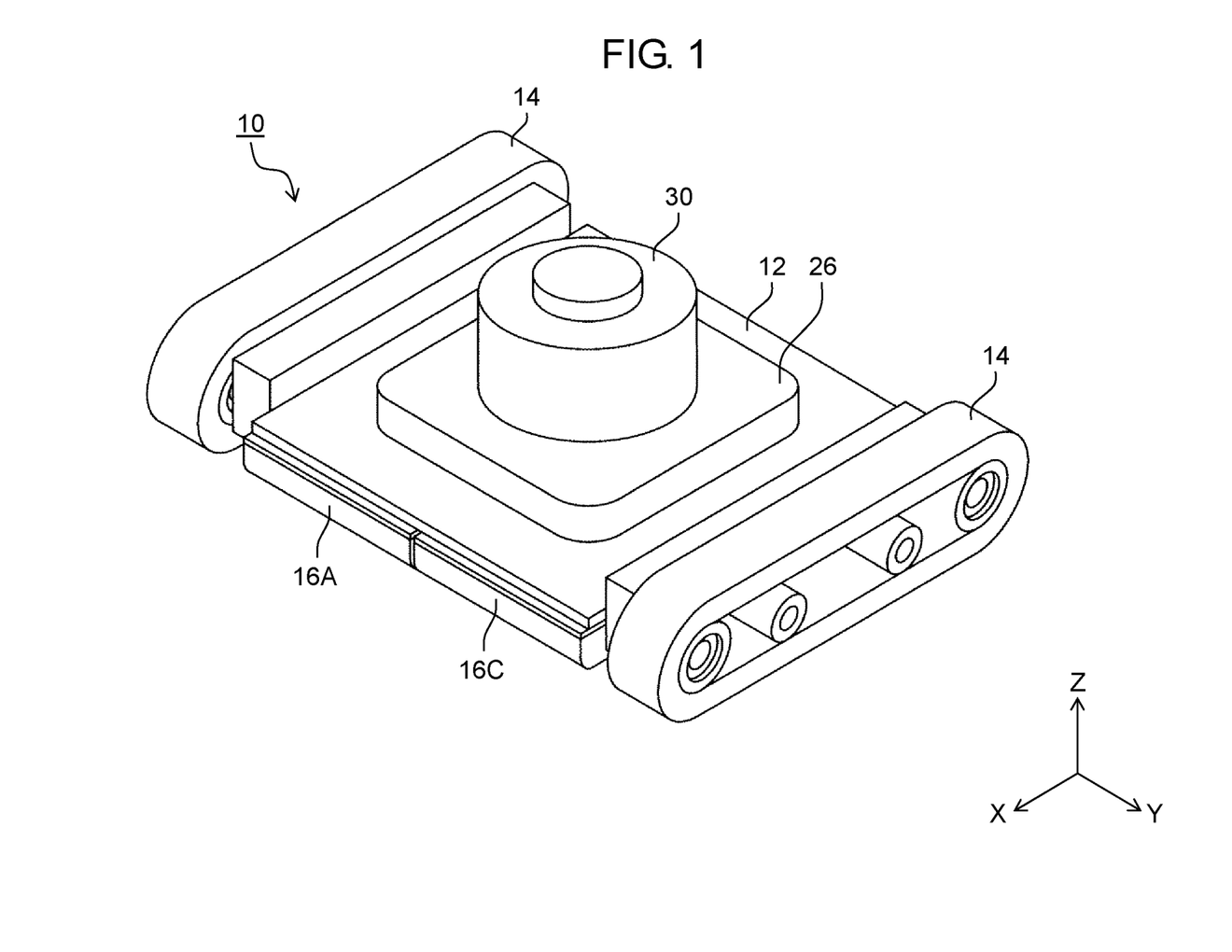
FIG. 1 is a perspective view of a wall surface suction-type travel device according to a first exemplary embodiment of the present disclosure.
Figure 2:
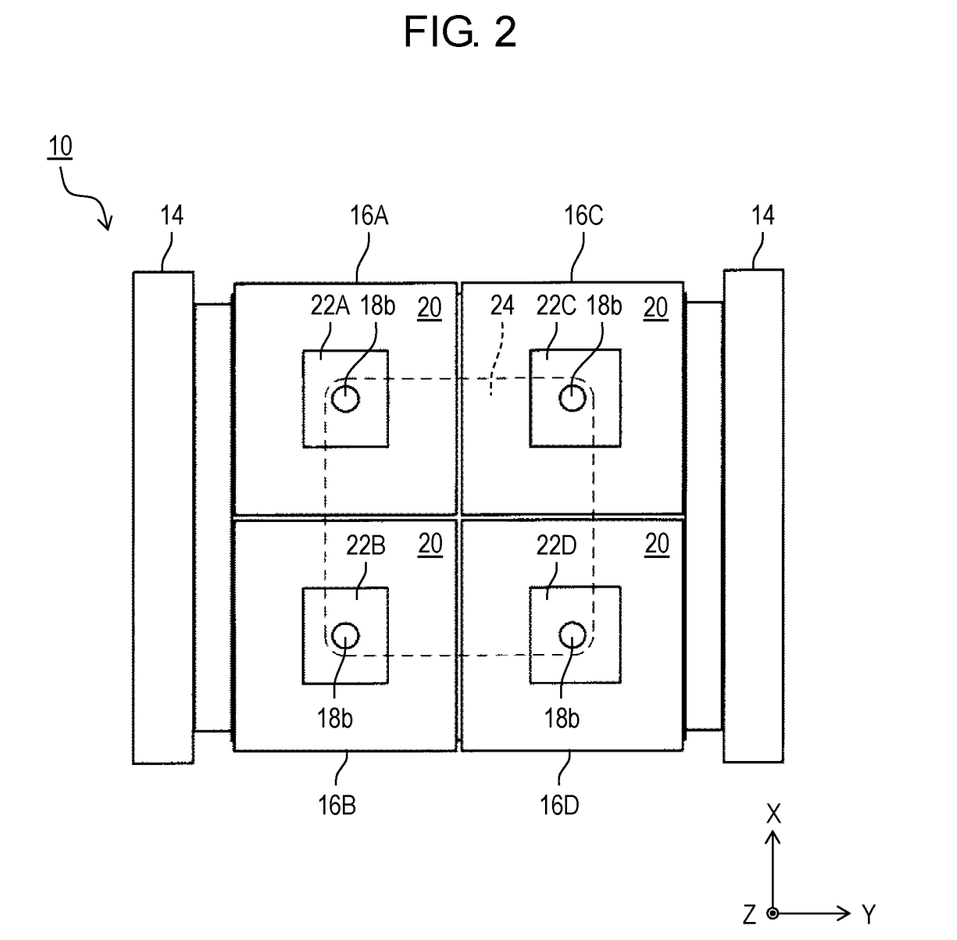
FIG. 2 is a bottom view of the wall surface suction-type travel device according to the first exemplary embodiment.

FIG. 1 is a schematic perspective view of a wall surface suction-type travel device according to a first exemplary embodiment of the present disclosure. FIG. 2 is a bottom view of the wall surface suction-type travel device. X-Y-Z orthogonal coordinate systems illustrated in the drawings are provided to help understanding of the present disclosure and are not intended to limit the present disclosure.

Wall surface suction-type travel device 10 shown in FIGS. 1 and 2 is a device capable of traveling on a wall surface while being suctioned on the wall surface. Surfaces on which the device is capable of traveling are not limited to wall surfaces. Wall surface suction-type travel device 10 is capable of traveling on an overhung surface such as a ceiling surface, as well as a floor surface.

As shown in FIGS. 1 and 2, wall surface suction-type travel device 10 includes main body 12, crawlers 14 disposed on both sides of main body 12 in a width direction (a Y-axis direction), and a plurality of suction units 16A to 16D that are disposed on a side of main body 12 adjacent to a wall surface and that are configured to be suctioned on the wall surface. Crawlers 14 roll on the wall surface while the plurality of suction units 16A to 16D is suctioned on the wall surface, and wall surface suction-type travel device 10 is thereby able to travel on the wall surface.

In the first exemplary embodiment, wall surface suction-type travel device 10, as shown in FIG. 2, has four suction units 16A to 16D. Four suction units 16A to 16D form two columns arranged along a direction (an X-axis direction) in which wall surface suction-type travel device 10 travels and form two rows arranged along the width direction (the Y-axis direction). These suction units 16A to 16D have a substantially identical configuration. Thus, a description may be given to some of the suction units as appropriate while a description of the remaining suction units may be omitted.

Figure 3:
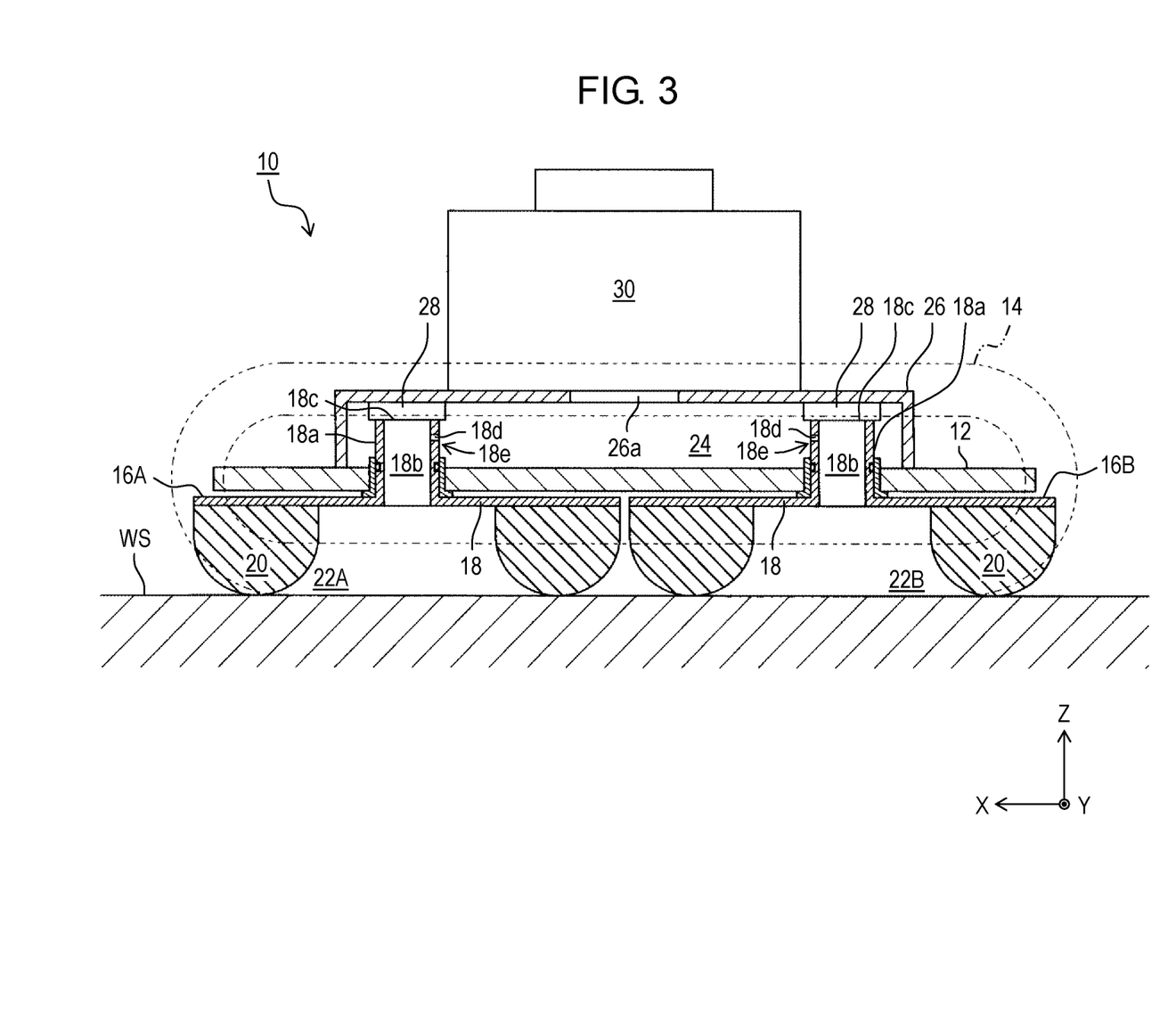
FIG. 3 is a cross-sectional view of the wall surface suction-type travel device according to the first exemplary embodiment.

FIG. 3 is a cross-sectional view of wall surface suction-type travel device 10 (a cross-sectional view along a Z-X plane), illustrating particularly a cross section of suction units 16A, 16B. Wall surface suction-type travel device 10 shown in FIG. 3 is in a stop state, i.e., a state in which the suction-type travel device is not suctioned on wall surface WS.

As shown in FIG. 3, suction unit 16A (and remaining suction units 16B to 16D) are disposed on main body 12 of wall surface suction-type travel device 10 such that each of the suction units is movable along a direction (a Z-axis direction) in which the suction units face wall surface WS.

In the first exemplary embodiment, suction unit 16A includes plate-shaped base 18. Base 18 has cylinder 18a (an example of a principal communicating part) passing through main body 12. A side of base 18 adjacent to wall surface WS is provided with loop-shaped sealant 20 (see FIG. 2). This sealant 20 is made of silicone rubber or another elastic material having elasticity. These base 18 and sealant 20 define recessed decompression chamber 22A facing wall surface WS. In the first exemplary embodiment, as shown in FIG. 3, crawlers 14 and sealants 20 are in contact with wall surface WS while the suction-type travel device is not suctioned onto wall surface WS. However, sealants 20 may be separated from wall surface WS while the suction-type travel device is not suctioned onto wall surface WS.

As shown in FIG. 3, decompression chamber 22A in suction unit 16A communicates with intermediate chamber 24 formed on main body 12 of wall surface suction-type travel device 10. In the first exemplary embodiment, intermediate chamber 24 is defined by cap-shaped decompression chamber housing 26 attached to main body 12. Cylinder 18a of suction unit 16A is inserted into such intermediate chamber 24, and hence decompression chamber 22A communicates with intermediate chamber 24 via internal flow path 18b of cylinder 18a.

As described in detail later, suction unit 16A moves in the wall surface facing direction (the Z-axis direction), thereby changing a degree to which cylinder 18a on base 18 of suction unit 16A is inserted into intermediate chamber 24. Accordingly, an end face of cylinder 18a comes into contact with or is separated from valve 28 disposed in intermediate chamber 24. Valve 28 is disposed so as to confront the end face of cylinder 18a. In other words, end face opening 18c of cylinder 18a is opened or closed by valve 28. As shown in FIG. 3, while suction unit 16A is not suctioned onto wall surface WS, valve 28 is in contact with the end face of cylinder 18a and end face opening 18c is closed by valve 28.

Valve 28 is, for example, made from an elastic material such as rubber. Secondary communicating part 18e is formed such that decompression chamber 22A and intermediate chamber 24 communicate with each other when end face opening 18c of cylinder 18a is closed by valve 28. Secondary communicating part 18e has secondary communicating hole 18d that is formed so as to radially pass through cylinder 18a. As described in detail later, secondary communicating hole 18d is formed such that an area of an opening of secondary communicating hole 18d is extremely smaller than an area of end face opening 18c of cylinder 18a.

As shown in FIG. 2, remaining suction units 16B to 16D as well have respective decompression chambers 22B to 22D. In a similar way to decompression chamber 22A in suction unit 16A, decompression chambers 22B to 22D each communicate with intermediate chamber 24.

Wall surface suction-type travel device 10 has suction device 30 to decompress shared intermediate chamber 24 that communicates with each of decompression chambers 22A to 22D of four suction units 16A to 16D shown in FIG. 2. In the first exemplary embodiment, suction device 30 is mounted on decompression chamber housing 26 and sucks in air from intermediate chamber 24 through suction hole 26a that is formed in decompression chamber housing 26. Suction device 30 is a device such as a suction pump or a fan used to discharge air from intermediate chamber 24 to an outside, for example.

Figure 4A:
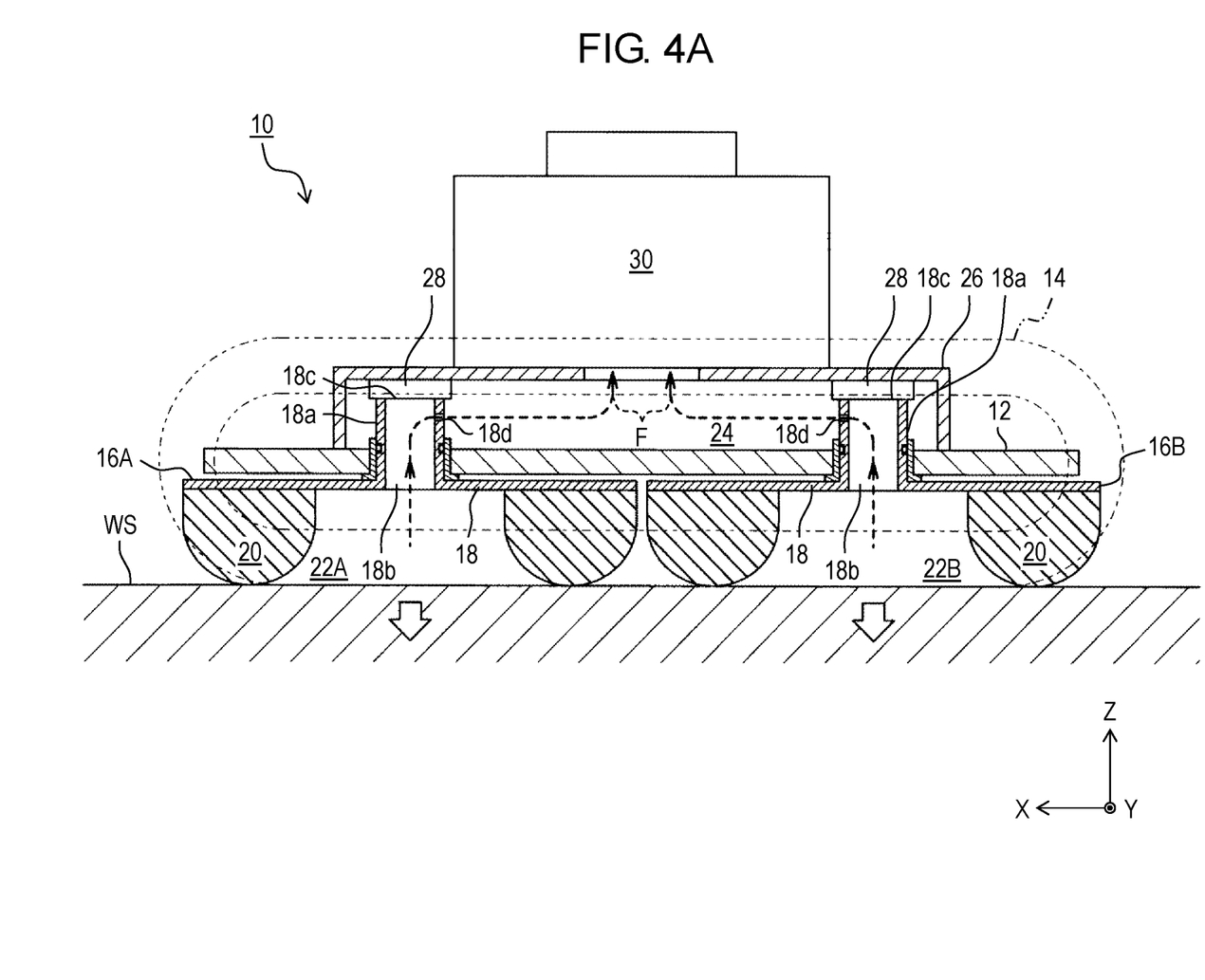
FIG. 4A is a cross-sectional view of the wall surface suction-type travel device according to the first exemplary embodiment in which the wall surface suction-type travel device has just started being suctioned on a wall surface.

As shown in FIG. 4A, while sealants 20 are in intimate contact with wall surface WS and decompression chambers 22A to 22D are not communicating with the outside, flow F of air occurs in response to the start of suction device 30's sucking in air from intermediate chamber 24. This decreases pressure inside intermediate chamber 24 and moves air from decompression chambers 22A to 22D of suction units 16A to 16D into intermediate chamber 24. Since end face opening 18c of each of suction units 16A to 16D is closed by valve 28, air moves from each of decompression chambers 22A to 22D into intermediate chamber 24 through secondary communicating holes 18d. Each hollow arrow indicates a state in which the suction unit is suctioned.

Figure 4B:
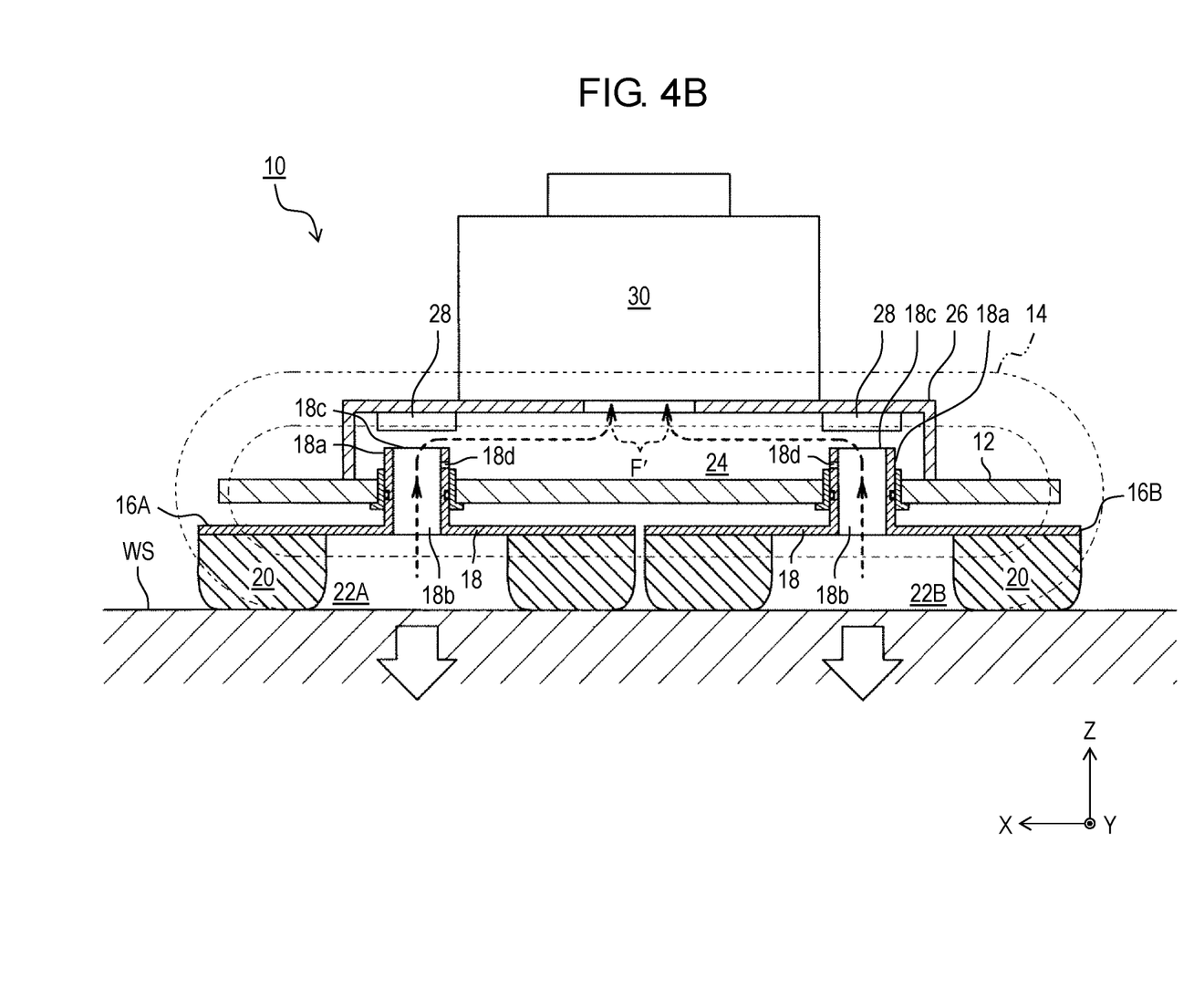
FIG. 4B is a cross-sectional view of the wall surface suction-type travel device according to the first exemplary embodiment in which the wall surface suction-type travel device has been completely suctioned on the wall surface.

As shown in FIG. 4B, along with a decrease in pressure inside each of decompression chambers 22A to 22D of suction units 16A to 16D, bases 18 of suction units 16A to 16D move nearer to wall surface WS. This compresses sealants 20 of suction units 16A to 16D in contact with wall surface WS in the wall surface facing direction (the Z-axis direction). This concurrently separates the end faces of cylinders 18a on bases 18 from valves 28, causing end face openings 18c to be opened. As a result, flow F' occurs such that air flows from decompression chambers 22A to 22D into intermediate chamber 24 mostly through end face openings 18c. Ultimately, the pressure in each of decompression chambers 22A to 22D is substantially equalized with the pressure in intermediate chamber 24, reaching predetermined negative pressure (pressure lower than atmospheric pressure) required for wall surface suction. When the pressure in each of decompression chambers 22A to 22D reaches the predetermined negative pressure, wall surface suction-type travel device 10 has been completely suctioned on wall surface WS and is permitted to travel on wall surface WS by crawlers 14.

This suction configuration enables wall surface suction-type travel device 10 to continue being suctioned on wall surface WS even if the pressure in some (not all) of the plurality of decompression chambers 22A to 22D gets higher than the pressure required for wall surface suction. For instance, while traveling and being suctioned on wall surface WS, wall surface suction-type travel device 10 is able to continue being suctioned on wall surface WS even if some of the decompression chambers arrive over a hollow, a through-hole, or any depression in the wall surface and communicate with the outside through the hollow, the through-hole, or the depression. This advantage will be specifically described.

Figure 5:
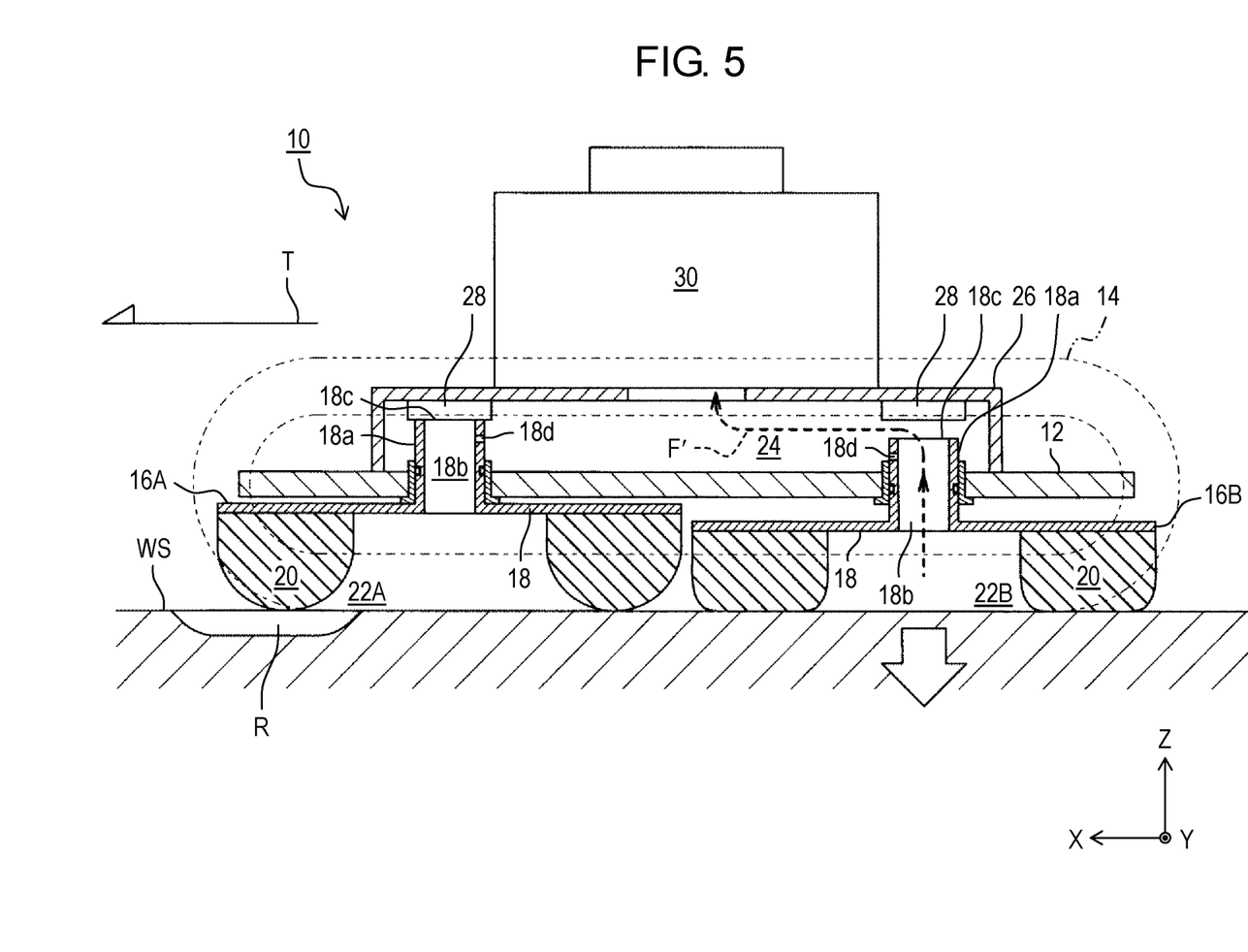
FIG. 5 is a cross-sectional view of the wall surface suction-type travel device according to the first exemplary embodiment in which one decompression chamber communicates with an outside through a hollow in the wall surface.

FIG. 5 illustrates wall surface suction-type travel device 10 traveling and being into a state in which the pressure in decompression chamber 22A out of the plurality of decompression chambers 22A to 22D gets higher than the pressure required for wall surface suction. Specifically, FIG. 5 shows the wall surface suction-type travel device traveling along travel direction T and being into a state in which decompression chamber 22A arrives over hollow R in wall surface WS and communicates with the outside through hollow R. Since decompression chamber 22A has communicated with the outside, the pressure in decompression chamber 22A rises from the pressure required for wall surface suction and reaches atmospheric pressure.

As shown in FIG. 5, when decompression chamber 22A communicates with the outside and the pressure in decompression chamber 22A reaches atmospheric pressure, a difference in pressure between decompression chamber 22A and intermediate chamber 24 arises. In other words, the former is relatively at high pressure and the latter is relatively at low pressure.

Because of such a difference in pressure, base 18 of suction unit 16A moves from near wall surface WS toward main body 12. In the first exemplary embodiment, elastic force generated when compressed sealant 20 returns to its original shape presses base 18 toward main body 12.

Due to the pressure difference between decompression chamber 22A and intermediate chamber 24, suction unit 16A moves to extend from wall surface WS toward main body 12. As a result, the end face of cylinder 18a of suction unit 16A comes into contact with valve 28. Thus, end face opening 18c is closed by valve 28. This prevents the pressure in intermediate chamber 24 from reaching atmospheric pressure through decompression chamber 22A communicating with the outside. This in turn prevents the pressure in remaining decompression chambers 22B to 22D that communicate with intermediate chamber 24 and do not communicate with the outside from reaching atmospheric pressure. This allows wall surface suction-type travel device 10 to continue being suctioned on wall surface WS with remaining suction units 16B to 16D except suction unit 16A provided with decompression chamber 22A.

As shown in FIG. 5, decompression chamber 22A communicating with the outside does not communicate with intermediate chamber 24 through end face opening 18c but communicates with intermediate chamber 24 through secondary communicating hole 18d. However, since the opening area of secondary communicating hole 18d is extremely smaller than the area of end face opening 18c, the pressure in intermediate chamber 24 does not reach atmospheric pressure as long as suction device 30 keeps sucking in air from intermediate chamber 24. In other words, the pressure in intermediate chamber 24 is substantially maintained at the predetermined negative pressure required for suction. To put it another way, the opening area of secondary communicating hole 18d is determined in consideration of suction performance of suction device 30 so as to substantially maintain the pressure in intermediate chamber 24 at the predetermined negative pressure even if decompression chamber 22A communicates with the outside.

When wall surface suction-type travel device 10 travels further, decompression chamber 22A moves from over hollow R and returns into a state in which decompression chamber 22A does not communicate with the outside. Consequently, air inside decompression chamber 22A, as shown in FIG. 4A, flows into intermediate chamber 24 through secondary communicating hole 18d and the pressure in decompression chamber 22A decreases. As the pressure in decompression chamber 22A further decreases, sealant 20 is compressed and end face opening 18c is thereby separated from valve 28. This, as shown in FIG. 4B, causes flow F' to occur again such that air flows from decompression chamber 22A into intermediate chamber 24 mostly through end face opening 18c. Then, the pressure in decompression chamber 22A is substantially equalized with the pressure in intermediate chamber 24, returning to the predetermined negative pressure required for wall surface suction.

In the first exemplary embodiment described above, an area of an opening of secondary communicating part 18e (the area of the opening of secondary communicating hole 18d) is smaller than an area of an opening of cylinder 18a (the area of end face opening 18c). If the pressure in decompression chamber 22A out of decompression chambers 22A to 22D gets higher than the pressure required for wall surface suction, the difference in pressure between decompression chamber 22A and intermediate chamber 24 causes valve 28 to close end face opening 18c. More specifically, if the pressure in decompression chamber 22A gets higher than the pressure required for wall surface suction, a consequent difference in pressure between decompression chamber 22A and intermediate chamber 24 causes suction unit 16A to move toward valve 28 and lets valve 28 close end face opening 18c.

According to the first exemplary embodiment described above, wall surface suction-type travel device 10 is able to continue being suctioned on wall surface WS even if some of the plurality of decompression chambers 22A to 22D have communicated with the outside through hollows R, through-holes, or other depressions in wall surface WS.

Second Exemplary Embodiment

Figure 6:
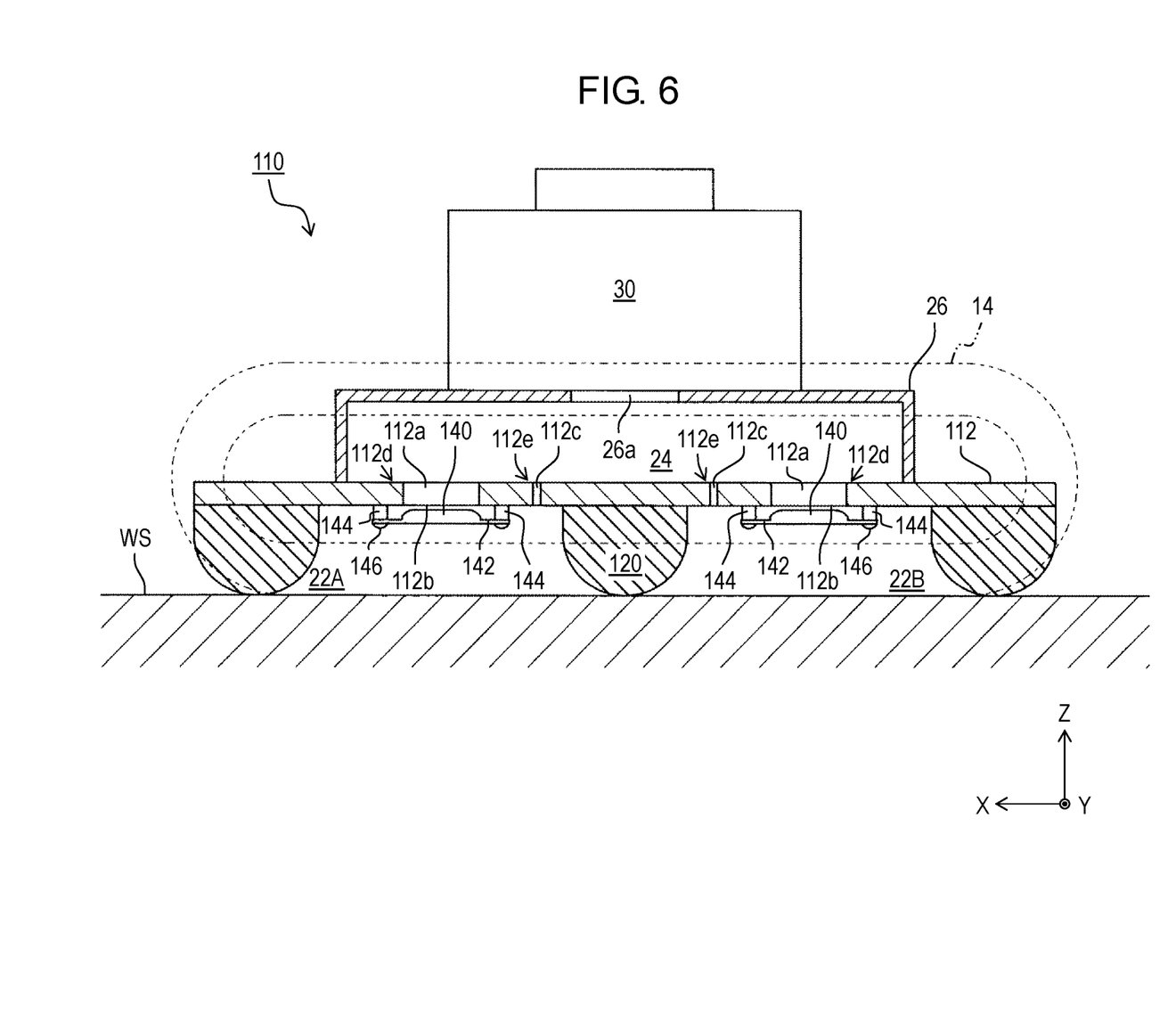
FIG. 6 is a cross-sectional view of a wall surface suction-type travel device according to a second exemplary embodiment of the present disclosure.
Figure 7:
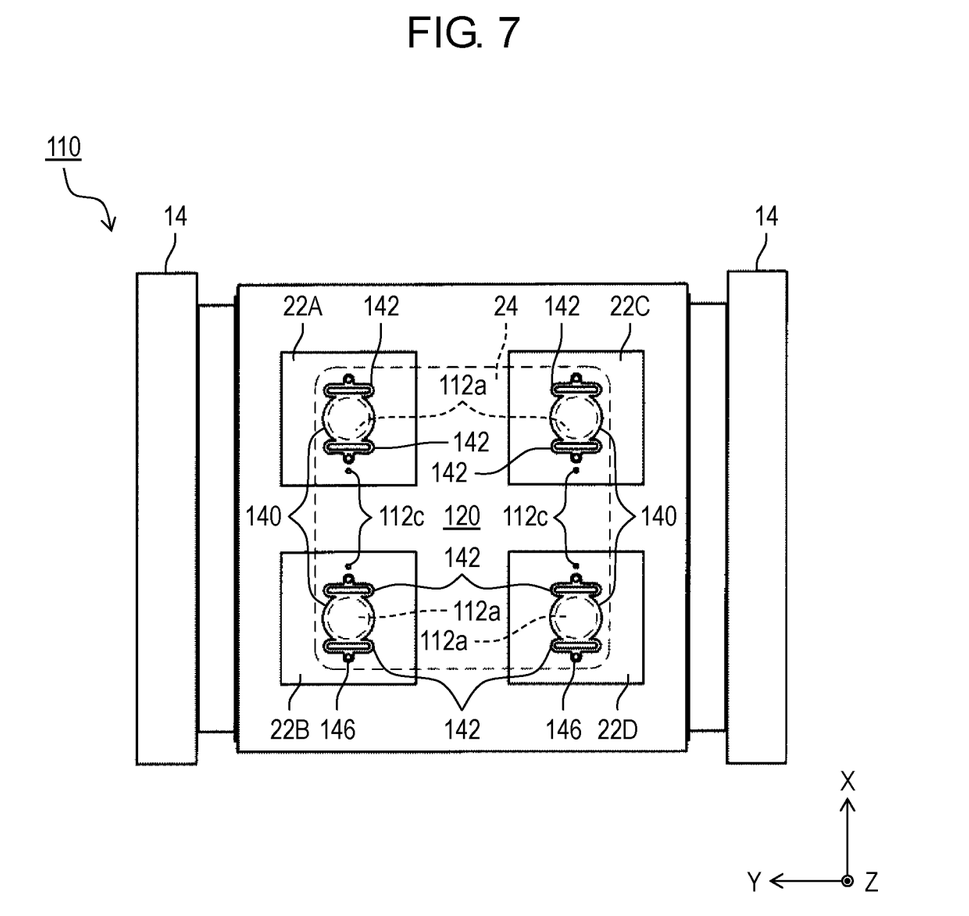
FIG. 7 is a bottom view of the wall surface suction-type travel device according to the second exemplary embodiment.

FIGS. 6 and 7 are a cross-sectional view and a bottom view, respectively, of a wall surface suction-type travel device according to a second exemplary embodiment. Components in the second exemplary embodiment that are substantially identical to those in the first exemplary embodiment described above are denoted by the same reference signs. Accordingly, the following description of the second exemplary embodiment is primarily given on differences between the first and the second exemplary embodiments.

As shown in FIG. 6, unlike wall surface suction-type travel device 10 of the first exemplary embodiment described above, wall surface suction-type travel device 110 according to the second exemplary embodiment does not include a plurality of suction units movable relative to a main body in the wall surface facing direction (the Z-axis direction). Instead, in wall surface suction-type travel device 110 of the second exemplary embodiment, main body 112 has a plurality of decompression chambers 22A to 22D.

Specifically, as shown in FIGS. 6 and 7, a side of main body 112 adjacent to wall surface WS is provided with lattice-shaped sealant 120. Main body 112 and lattice-shaped sealant 120 define recessed decompression chambers 22A to 22D facing wall surface WS.

Decompression chambers 22A to 22D each communicate with intermediate chamber 24 through principal communicating parts 112d formed in main body 112. Each principal communicating part 112d has flow path 112a that is formed like a through-hole. Valve 140 is provided so as to face decompression chamber-side opening 112b of flow path 112a.

Valve 140 is, for example, made from an elastic material such as rubber. As shown in FIG. 6, valve 140 is supported by valve support 142 having elasticity. Valve support 142 is fastened to main body 112 via spacers 144 and screws 146. Specifically, elastic valve support 142 in its original state is fastened to main body 112 via spacers 144 such that decompression chamber-side opening 112b is not closed by valve 140. In the second exemplary embodiment, valve 140 and valve support 142 are, for example, made from an identical elastic material such as rubber and are integrated together as one component.

As described in detail later, main body 112 has secondary communicating parts 112e that are formed to let respective decompression chambers 22A to 22D communicate with intermediate chamber 24. The secondary communicating parts allow air to move from respective decompression chambers 22A to 22D into intermediate chamber 24 inside which is suctioned by suction device 30 while decompression chamber-side opening 112b is closed by each valve 140. Secondary communicating hole 112c is formed in secondary communicating part 112e.

Figure 8A:
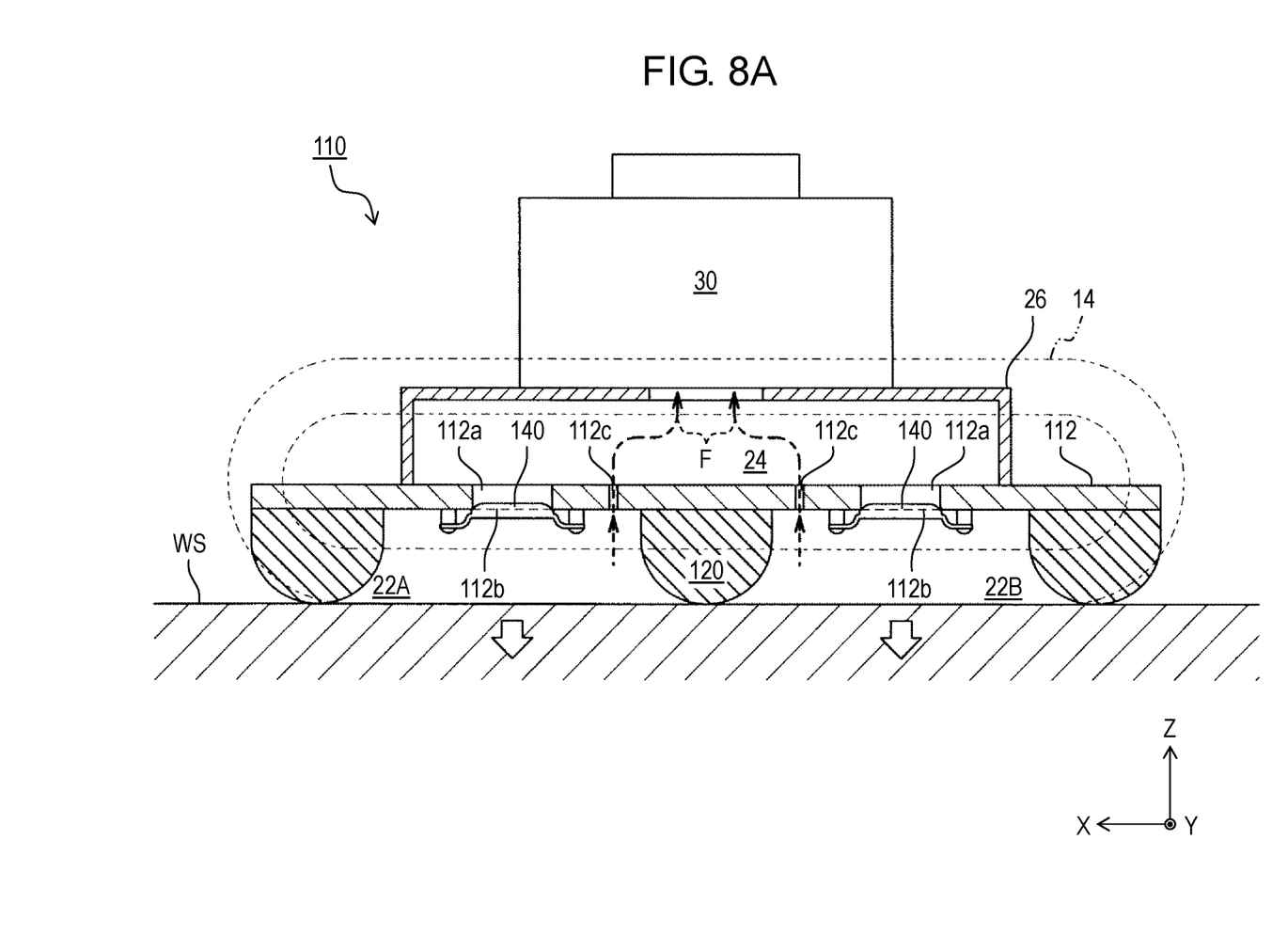
FIG. 8A is a cross-sectional view of the wall surface suction-type travel device according to the second exemplary embodiment in which the wall surface suction-type travel device has just started being suctioned on a wall surface.

As shown in FIG. 8A, while sealant 120 is in intimate contact with wall surface WS and decompression chambers 22A to 22D are not communicating with the outside, pressure in intermediate chamber 24 decreases in response to the start of suction device 30's sucking in air from intermediate chamber 24. This results in a difference in pressure between each of decompression chambers 22A to 22D and intermediate chamber 24, and the pressure difference causes each valve 140 to move toward intermediate chamber 24 against elastic force of valve support 142. As a result, valve 140 closes decompression chamber-side opening 112b. After each valve 140 closes decompression chamber-side opening 112b, air moves from decompression chambers 22A to 22D into intermediate chamber 24 through respective secondary communicating holes 112c (flow F of air occurs).

Figure 8B:
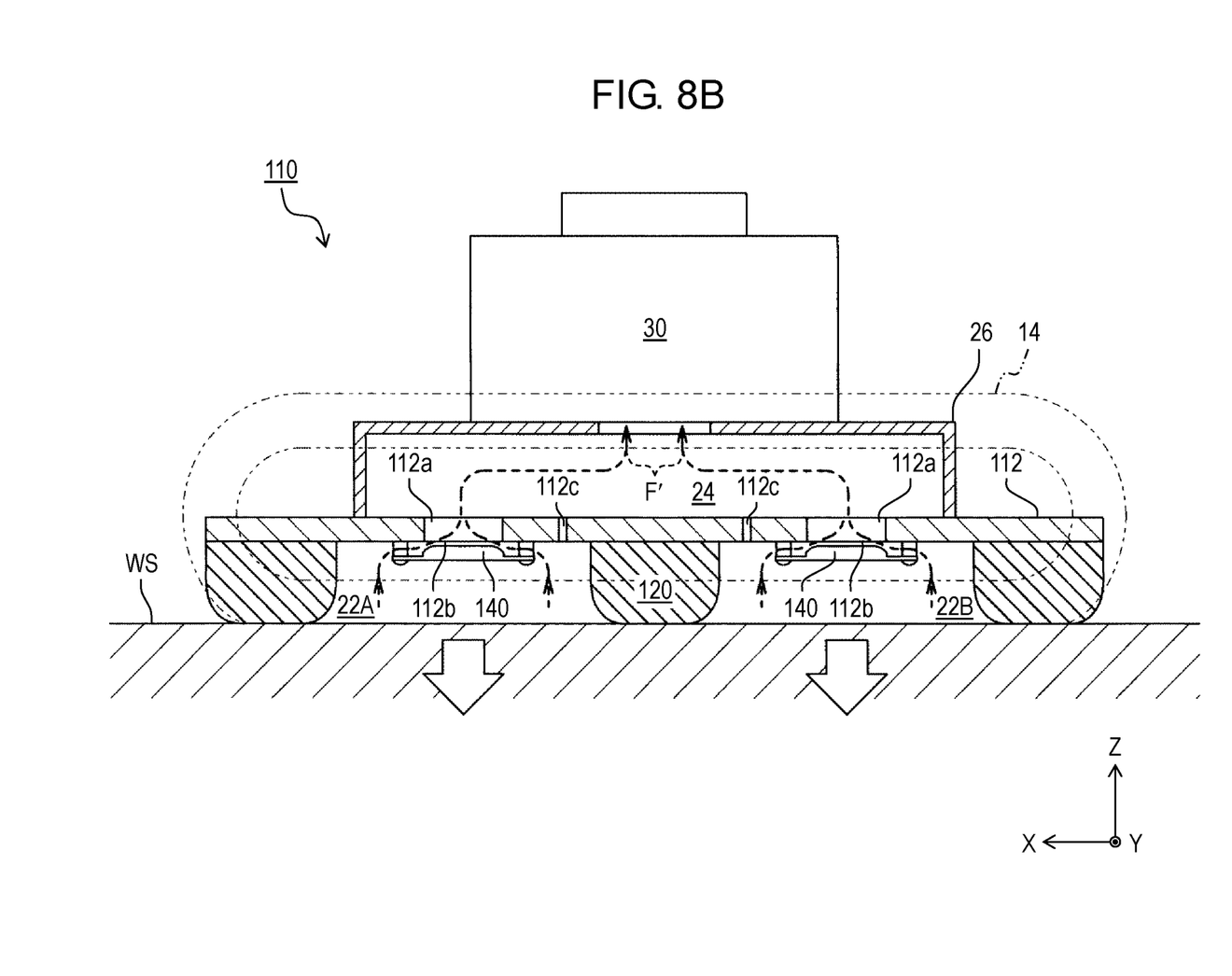
FIG. 8B is a cross-sectional view of the wall surface suction-type travel device according to the second exemplary embodiment in which the wall surface suction-type travel device has been completely suctioned on the wall surface.

As shown in FIG. 8B, suction device 30 keeps sucking in air and as the pressure difference between each of decompression chambers 22A to 22D and intermediate chamber 24 gets small, the elastic force of each valve support 142 causes valve 140 to be separated from decompression chamber-side opening 112b. In other words, decompression chamber-side opening 112b opens. As a result, flow F' occurs such that air flows from decompression chambers 22A to 22D into intermediate chamber 24 mostly through decompression chamber-side openings 112b. Ultimately, the pressure in each of decompression chambers 22A to 22D is substantially equalized with the pressure in intermediate chamber 24, reaching predetermined negative pressure (pressure lower than atmospheric pressure) required for wall surface suction. When the pressure in each of decompression chambers 22A to 22D reaches the predetermined negative pressure, wall surface suction-type travel device 110 has been completely suctioned on wall surface WS and is permitted to travel on wall surface WS by crawlers 14.

In a similar way to wall surface suction-type travel device 10 of the first exemplary embodiment described above, wall surface suction-type travel device 110 according to the second exemplary embodiment is able to continue being suctioned on wall surface WS even if the pressure in some (not all) of the plurality of decompression chambers 22A to 22D gets higher than the pressure required for wall surface suction.

Figure 9:
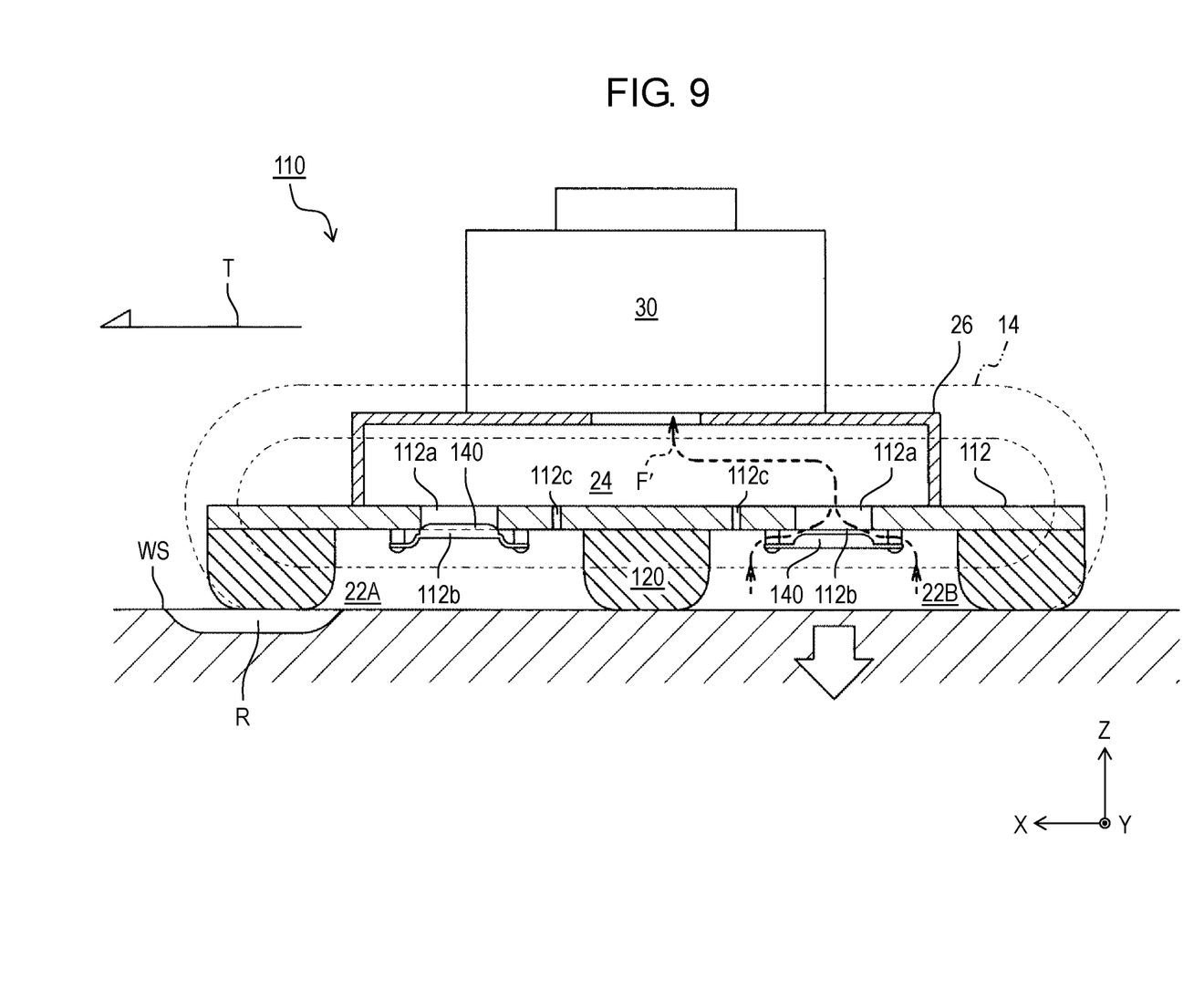
FIG. 9 is a cross-sectional view of the wall surface suction-type travel device according to the second exemplary embodiment in which one decompression chamber communicates with an outside through a hollow in the wall surface.

FIG. 9 illustrates wall surface suction-type travel device 110 traveling and being into a state in which the pressure in decompression chamber 22A out of the plurality of decompression chambers 22A to 22D gets higher than the pressure required for wall surface suction. Specifically, FIG. 9 shows the wall surface suction-type travel device traveling along travel direction T and being into a state in which decompression chamber 22A arrives over hollow R in wall surface WS and communicates with the outside through hollow R. Consequently, the pressure in decompression chamber 22A rises from the pressure required for wall surface suction and reaches atmospheric pressure.

As shown in FIG. 9, when decompression chamber 22A communicates with the outside and the pressure in decompression chamber 22A reaches atmospheric pressure, a difference in pressure between decompression chamber 22A and intermediate chamber 24 arises. In other words, the former is relatively at high pressure and the latter is relatively at low pressure.

In response to the pressure difference between decompression chamber 22A and intermediate chamber 24, valve 140 moves toward intermediate chamber 24 against the elastic force of valve support 142. As a result, valve 140 closes decompression chamber-side opening 112b. This prevents the pressure in intermediate chamber 24 from reaching atmospheric pressure through decompression chamber 22A communicating with the outside. This in turn prevents the pressure in remaining decompression chambers 22B to 22D that communicate with intermediate chamber 24 and do not communicate with the outside from reaching atmospheric pressure. This allows wall surface suction-type travel device 110 to continue being suctioned on wall surface WS with remaining decompression chambers 22B to 22D except decompression chamber 22A.

As shown in FIG. 9, decompression chamber 22A communicating with the outside does not communicate with intermediate chamber 24 through decompression chamber-side openings 112b but communicates with intermediate chamber 24 through secondary communicating holes 112c. However, since an area of an opening of secondary communicating hole 112c is extremely smaller than an area of decompression chamber-side opening 112b, the pressure in intermediate chamber 24 does not reach atmospheric pressure as long as suction device 30 keeps sucking in air from intermediate chamber 24. In other words, the pressure in intermediate chamber 24 is substantially maintained at the predetermined negative pressure required for suction. To put it another way, the opening area of secondary communicating hole 112c is determined in consideration of suction performance of suction device 30 so as to substantially maintain the pressure in intermediate chamber 24 at the predetermined negative pressure even if decompression chamber 22A communicates with the outside.

When wall surface suction-type travel device 110 travels further, decompression chamber 22A moves from over hollow R and returns into a state in which decompression chamber 22A does not communicate with the outside. Consequently, air inside decompression chamber 22A, as shown in FIG. 8A, flows into intermediate chamber 24 through secondary communicating hole 112c and the pressure in decompression chamber 22A decreases. As the pressure in decompression chamber 22A decreases further and the difference in pressure between decompression chamber 22A and intermediate chamber 24 gets small, valve 140 is separated from decompression chamber-side opening 112b. This, as shown in FIG. 8B, causes flow F' to occur again such that air flows from decompression chamber 22A into intermediate chamber 24 mostly through decompression chamber-side opening 112b. Then, the pressure in decompression chamber 22A is substantially equalized with the pressure in intermediate chamber 24, returning to the predetermined negative pressure required for wall surface suction.

In the second exemplary embodiment described above, an area of an opening of secondary communicating part 112e (the area of the opening of secondary communicating hole 112c) is smaller than an area of an opening of principal communicating part 112d (the area of decompression chamber-side opening 112b). If the pressure in decompression chamber 22A out of decompression chambers 22A to 22D gets higher than the pressure required for wall surface suction, the difference in pressure between decompression chamber 22A and intermediate chamber 24 causes valve 140 to close decompression chamber-side opening 112b. More specifically, if the pressure in decompression chamber 22A gets higher than the pressure required for wall surface suction, a consequent difference in pressure between decompression chamber 22A and intermediate chamber 24 causes valve support 142 to be elastically deformed such that valve 140 moves toward decompression chamber-side opening 112b. Valve 140 thereby closes decompression chamber-side opening 112b.

According to the second exemplary embodiment described above, wall surface suction-type travel device 110 is able to continue being suctioned on wall surface WS even if some of the plurality of decompression chambers 22A to 22D have communicated with the outside through hollows R, through-holes, or other depressions in wall surface WS.

Exemplary embodiments of the present disclosure are not limited to the exemplary embodiment described above.

In the first exemplary embodiment described above, as shown in FIG. 1, wall surface suction-type travel device 10, for example, has crawlers as means for traveling on the wall surface, i.e., a rolling part for rolling on the wall surface. However, exemplary embodiments of the present disclosure are not limited to this example. For instance, the rolling parts of wall surface suction-type travel device 10 used to travel and roll on the wall surface may be rollers, wheels, or something similar.

In the first exemplary embodiment described above, as shown in FIG. 2, wall surface suction-type travel device 10 has four decompression chambers 22A to 22D. However, exemplary embodiments of the present disclosure are not limited to this example. A wall surface suction-type travel device according to an exemplary embodiment of the present disclosure has at least two decompression chambers that each communicate with one suction device (one intermediate chamber). However, exemplary embodiments of the present disclosure are not limited to a wall surface suction-type travel device that includes just one suction device.

In the first exemplary embodiment described above, as shown in FIG. 5, when decompression chamber 22A communicates with the outside, a difference in pressure between decompression chamber 22A and intermediate chamber 24 arises, and this causes base 18 of suction unit 16A to move from near wall surface WS toward main body 12. Elastic force generated when compressed sealant 20 returns to its original shape presses base 18 toward main body 12. In other words, sealant 20 functions as an urging member to urge suction unit 16A toward valve 28. As a result, end face opening 18c of cylinder 18a of suction unit 16A comes into contact with and is closed by valve 28 with increased reliability. However, the urging member is not limited to sealant 20. For instance, a suction unit and a main body may be linked together via a spring to urge the suction unit toward a valve by pulling force of the spring. The spring and sealant 20 may be used in combination.

A sealant or another urging member may be omitted, with proviso that a difference generated in pressure between a decompression chamber and an intermediate chamber when the decompression chamber communicates with an outside is solely enough to enable a suction unit to move from a wall surface toward a main body. For instance, while a wall surface suction-type travel device is suctioned on and is traveling on a wall surface along a vertical direction, a difference generated in pressure between a decompression chamber and an intermediate chamber is solely enough to enable a suction unit to move in a wall surface facing direction extending from the wall surface toward a main body, i.e., in a horizontal direction.

Wall surface suction-type travel device 10 of the first exemplary embodiment described above and wall surface suction-type travel device 110 of the second exemplary embodiment described above are, to put it concisely, configured so as to enable a valve to close an opening of a flow path between a decompression chamber that has communicated with an outside and an intermediate chamber. In the first exemplary embodiment, an opening (in other words, a suction unit having end face opening 18c) moves toward a stationary vale (valve 28) and the valve thereby closes the opening. Meanwhile, in the second exemplary embodiment, a valve (valve 140) moves toward a stationary opening (decompression chamber-side opening 112b) and the valve thereby closes the opening. However, exemplary embodiments of the present disclosure are not limited to these examples. For instance, a wall surface suction-type travel device may be configured such that both an opening (in other words, a component having an opening) and a valve move and the valve thereby closes the opening.

In other words, in a broad sense, a wall surface suction-type travel device according to the present disclosure is capable of traveling on a wall surface while being suctioned on the wall surface. The wall surface suction-type travel device includes a plurality of recessed decompression chambers facing the wall surface, a shared intermediate chamber, a suction device, a plurality of principal communicating parts, a plurality of secondary communicating parts, and a plurality of valves. The intermediate chamber communicates with each of the plurality of decompression chambers. The suction device sucks in air from the intermediate chamber to decompress the intermediate chamber. The plurality of principal communicating parts allows the respective decompression chambers to communicate with the intermediate chamber. The plurality of secondary communicating parts allows the respective decompression chambers to communicate with the intermediate chamber. The plurality of valves is disposed so as to face openings of the respective principal communicating parts. An area of an opening of each of the plurality of secondary communicating parts is smaller than an area of the opening of each of the plurality of principal communicating parts. If pressure in one of the plurality of decompression chambers gets higher than pressure required for wall surface suction, a consequent difference in pressure between the one decompression chamber and the intermediate chamber causes the corresponding valve of the plurality of valves to close the opening of the corresponding principal communicating part of the plurality of principal communicating parts.

The exemplary embodiments have been described above as examples of the technique of the present disclosure. For this purpose, the accompanying drawings and the detailed description have been provided. Accordingly, in order to illustrate the above technique, the components described in the accompanying drawings and the detailed description may include not only components that are essential for solving the problem but also components that are not essential for solving the problem. For this reason, it should not be immediately deemed that those unessential components are essential just because those unessential components are described in the accompanying drawings and the detailed description.

Since the above described exemplary embodiments are intended to exemplify the technique according to the present disclosure, various modifications, replacements, additions, and omissions can be made within the scope of the appended claims or of their equivalents.

INDUSTRIAL APPLICABILITY

The present disclosure is applicable to a device that travels on a wall surface while being suctioned on the wall surface.

REFERENCE MARKS IN THE DRAWINGS

10: wall surface suction-type travel device
16A: suction unit
16B: suction unit
16C: suction unit 16D: suction unit
18a: cylinder principal communicating part)
18b: internal flow path
18c: end face opening
18e: secondary communicating part
22A: decompression chamber
22B: decompression chamber
22C: decompression chamber
22D: decompression chamber
20: sealant (urging member)
24: intermediate chamber
28: valve
30: suction device
142: valve support

The invention claimed is:

1. A wall surface suction device comprising:
a plurality of decompression chambers being recessed and facing a wall surface;
an intermediate chamber communicating with each of the plurality of decompression chambers;
a suction device sucking in air from the intermediate chamber to decompress the intermediate chamber;
a plurality of principal communicating parts disposed in the intermediate chamber, and allowing the respective decompression chambers to communicate with the intermediate chamber;
a plurality of secondary communicating parts disposed in the intermediate chamber, and allowing the respective decompression chambers to communicate with the intermediate chamber; and
a plurality of valves facing openings of the respective principal communicating parts,
wherein an area of an opening of each of the plurality of secondary communicating parts is smaller than an area of an opening of a corresponding one of the plurality of principal communicating parts, and
wherein on a condition that a pressure in one of the plurality of decompression chambers gets higher than pressure required for wall surface suction, a consequent difference in pressure between the one of the decompression chambers and the intermediate chamber causes a corresponding one of the plurality of valves to close the opening of a corresponding one of the plurality of principal communicating parts.

2. The wall surface suction device according to claim 1, further comprising a plurality of suction units being movable and having the respective decompression chambers and the respective principal communicating parts,
wherein the plurality of valves are disposed in the intermediate chamber, and
wherein on a condition that the pressure in the one of the decompression chambers gets higher than the pressure required for wall surface suction, the consequent difference in the pressure between the one of the decompression chambers and the intermediate chamber causes a corresponding one of the plurality of suction units to move toward the corresponding one of the valves and lets the corresponding one of the valves close the opening of the corresponding one of the principal communicating parts.

3. The wall surface suction device according to claim 2, further comprising an urging member to urge the corresponding one of the suction units toward the corresponding one of the valves.

4. The wall surface suction device according to claim 3, wherein the urging member is a loop-shaped sealant that is made of an elastic material and that is put into contact with the wall surface.

5. The wall surface suction device according to claim 1, further comprising a valve support having elasticity and supporting the corresponding one of the valves,
wherein on a condition that the pressure in the one of the decompression chambers gets higher than the pressure required for wall surface suction, the consequent difference in the pressure between the one of the decompression chambers and the intermediate chamber causes the valve support to be elastically deformed in such a way that the corresponding one of the valves moves toward the corresponding one of the principal communicating parts to close the opening of the corresponding one of the principal communicating parts.

6. The wall surface suction device according to claim 5, wherein the corresponding one of the valves and the valve support are integrated together as one component.

* * * * *